United States Patent
Nishitani et al.

[11] Patent Number: 6,145,402
[45] Date of Patent: Nov. 14, 2000

[54] STEERING MODULE

[75] Inventors: Keizo Nishitani; Toshifumi Okahira; Tomohiko Matsushita, all of Shizuoka, Japan

[73] Assignee: Yazaki Corporation, Tokyo, Japan

[21] Appl. No.: 09/197,570

[22] Filed: Nov. 23, 1998

[30] Foreign Application Priority Data

Nov. 21, 1997 [JP] Japan .................................. 9-321406

[51] Int. Cl.[7] ................ B62D 1/18; B62D 3/02
[52] U.S. Cl. ................ 74/484 R; 74/498; 439/34
[58] Field of Search ................ 74/484 R, 498; 439/34

[56] References Cited

U.S. PATENT DOCUMENTS

| | | | |
|---|---|---|---|
| 3,543,874 | 12/1970 | Nevett | 74/498 X |
| 4,429,588 | 2/1984 | Emundts et al. | 74/484 R |
| 4,635,029 | 1/1987 | Yamada | 340/22 |
| 4,638,287 | 1/1987 | Umebayashi et al. | 340/22 |
| 4,771,650 | 9/1988 | Kerner | 74/498 |
| 5,072,628 | 12/1991 | Oki | 74/484 R |
| 5,152,358 | 10/1992 | Kozuka | 74/498 X |

FOREIGN PATENT DOCUMENTS 60-69752  5/1985  Japan .................. B60R 16/02

*Primary Examiner*—Allan D. Herrmann
*Attorney, Agent, or Firm*—Sughrue, Mion, Zinn, Macpeak & Seas, PLLC

[57] ABSTRACT

A steering module comprises: a steering wheel attached to a member which is attached to a car body portion, the steering wheel being connected to a steering shaft which passes through the member; a pad having at least one electric part, the pad being attached to the member through the steering wheel; a first connector arranged in the member; and a second connector arranged in the pad, the second connector electrically connecting with the electrical part, and electrically connected to the first connector. The steering module further comprises: an external gear secured to the steering shaft; an internal gear connected to the steering wheel, the internal gear being arranged to surround the external gear; and an intermediate gear rotatably supported by the member attached to the car body portion, the intermediate gear being located between and engaged with the external gear and the internal gear. In the steering module, the first connector is located at an inside of the internal gear. The first connector electrically connects with a wire harness arranged in the car body portion. The electric part includes one of a display unit and an operation switch mounted in the pad.

5 Claims, 5 Drawing Sheets

STEERING MODULE

BACKGROUND OF THE INVENTION

1. Field of the Invention

The present invention relates to a steering module including a non-rotative pad attached to a central portion of a steering wheel.

The present application is based on Japanese Patent Application No. Hei. 9-321406, which is incorporated herein by reference.

2. Description of the Related Art

In recent years, a variety of switches for controlling a driving operation and operating audio units have intensively been mounted on a pad attached to a central portion of a steering wheel in addition to the horn switch. To improve the operability and visibility of the switches, a variety of steering wheel apparatuses have been suggested each of which has a structure that the pad is secured to the car body portion to inhibit rotation of the pad.

As an example of a steering wheel apparatus of the foregoing type, a structure disclosed in, for example, Unexamined Japanese Utility Model Publication No. Sho. 60-69752 will now be described with reference to FIG. 6. FIG. 6 is an exploded perspective view showing a steering wheel apparatus.

A housing 1 is secured to a steering column (not shown). A first substrate 3 is secured to the housing 1. A steering shaft 5 passes through a central portion of the housing 1 and a central portion of the first substrate 3. An external gear 7 is secured to a leading end of the steering shaft 5.

An annular internal gear 13 is connected to a steering wheel 9 through a spoke 11. The internal gear 13 is accommodated in the housing 1 such that the internal gear 13 surrounds the external gear 7. The internal gear 13 is rotatably accommodated in the housing 1 by a second substrate 15 secured to a position apart from the first substrate 3.

An intermediate gear 17, which is engaged with the external gear 7 and the internal gear 13, is rotatably supported by the first substrate 3. A pad substrate 19 having operation switches and a variety of electric devices is secured to the second substrate 15. The pad substrate 19 is covered by a cover 21 so that a pad 23 is formed. The first substrate 3 and the second substrate 15 have through holes 25 and 27. The through holes 25 and 27 are formed to penetrate a wire harness 29 which is connected to the pad substrate 19 and extending from the car body portion.

The steering wheel apparatus has the above-mentioned structure in that the pad 23 is secured to the car body portion through the housing 1, the first substrate 3 and the second substrate 15. Thus, the pad 23 is made to be non-rotative. When the steering shaft 5 is rotated through the internal gear 13, the intermediate gear 17 and the external gear 7 because the steering wheel 9 has been rotated, the pad 23 maintains a stationary state. Therefore, the operability and visibility of the switches and so forth can be improved.

However, the above-mentioned steering wheel apparatus has the structure that the plural through holes are formed in the first and second substrates. Moreover, the wire harness extending from the car body portion is caused to penetrate the housing, the first substrate, the internal gear and the second substrate so as to be connected to a connector mounted on the pad substrate. Therefore, the wire harness must be caused to penetrate the foregoing components whenever the component is assembled. If a plurality of wire harnesses are provided, many penetrating operations must be performed. As a result, the workability of the assembling operation deteriorates.

Since the wire harness is caused to penetrate the foregoing components, the length of wire harness must have a somewhat great slack as compared with the length after the assembling operation has been completed. When the wire harness having the foregoing slack is allowed to pass through the internal gear which is rotated, there is apprehension that, for example, the wire harness is bit by the internal gear owning to looseness.

SUMMARY OF THE INVENTION

In view of the foregoing, an object of the present invention is to provide a steering wheel structure in which workability of an operation for assembling the steering module is improved and a bite of the wire harness is effectively prevented.

To achieve the above object, according to the present invention, there is provided a steering module which comprises: a steering wheel attached to a member which is attached to a car body portion, the steering wheel being connected to a steering shaft which passes through the member; a pad having at least one electric part, the pad being attached to the member through the steering wheel; a first connector arranged in the member; and a second connector arranged in the pad, the second connector electrically connecting with the electrical part, and electrically connected to the first connector. It is preferable that the second connector is electrically connected to the first connector when the pad is attached to the member attached to the car body portion. Further, it is preferable that the steering module further comprises: an external gear secured to the steering shaft; an internal gear connected to the steering wheel, the internal gear being arranged to surround the external gear; and an intermediate gear rotatably supported by the member attached to the car body portion, the intermediate gear being located between and engaged with the external gear and the internal gear; wherein the first connector is located at an inside of the internal gear. Furthermore, it is preferable that the first connector electrically connects with a wire harness arranged in the car body portion. Furthermore, it is preferable that the electric part includes one of a display unit and an operation switch mounted in the pad. Accordingly, the pad does not approach the wire harness, and is directly connected to the connector of the car body portion. Thus, the steering wheel structure having a pad attached to the central portion thereof such that the pad is made to be non-rotative, is allowed to eliminate necessity of insertion of the wire harness into the components such as the internal gear.

Further, since the wire harness having the slack is not inserted into the internal gear, a bite of the wire harness with respect to the internal gear can be prevented.

DETAILED DESCRIPTION OF THE PREFERRED EMBODIMENT

Figure 1:
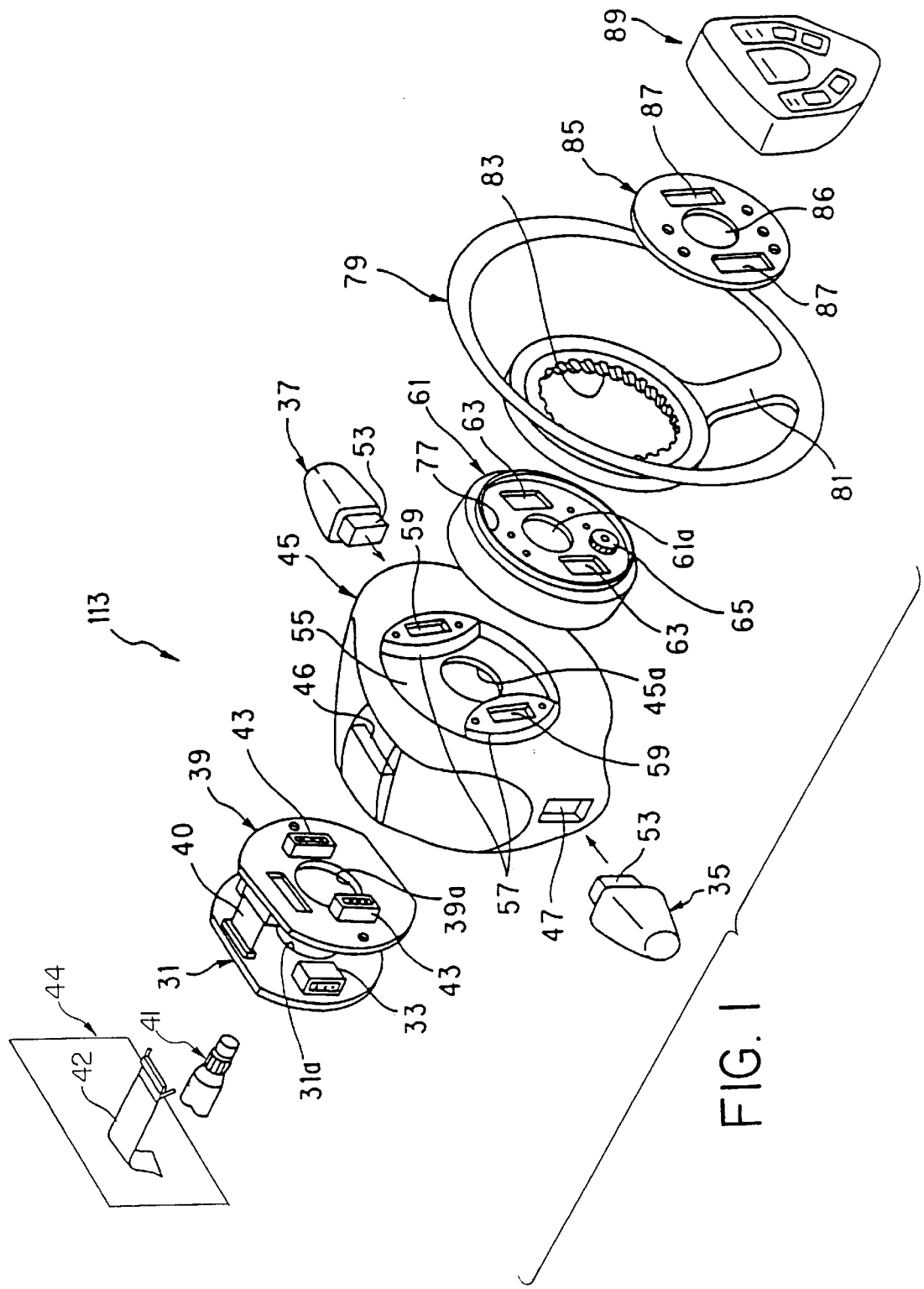
FIG. 1 is an exploded perspective view showing a steering module according to the present invention.
Figure 2:
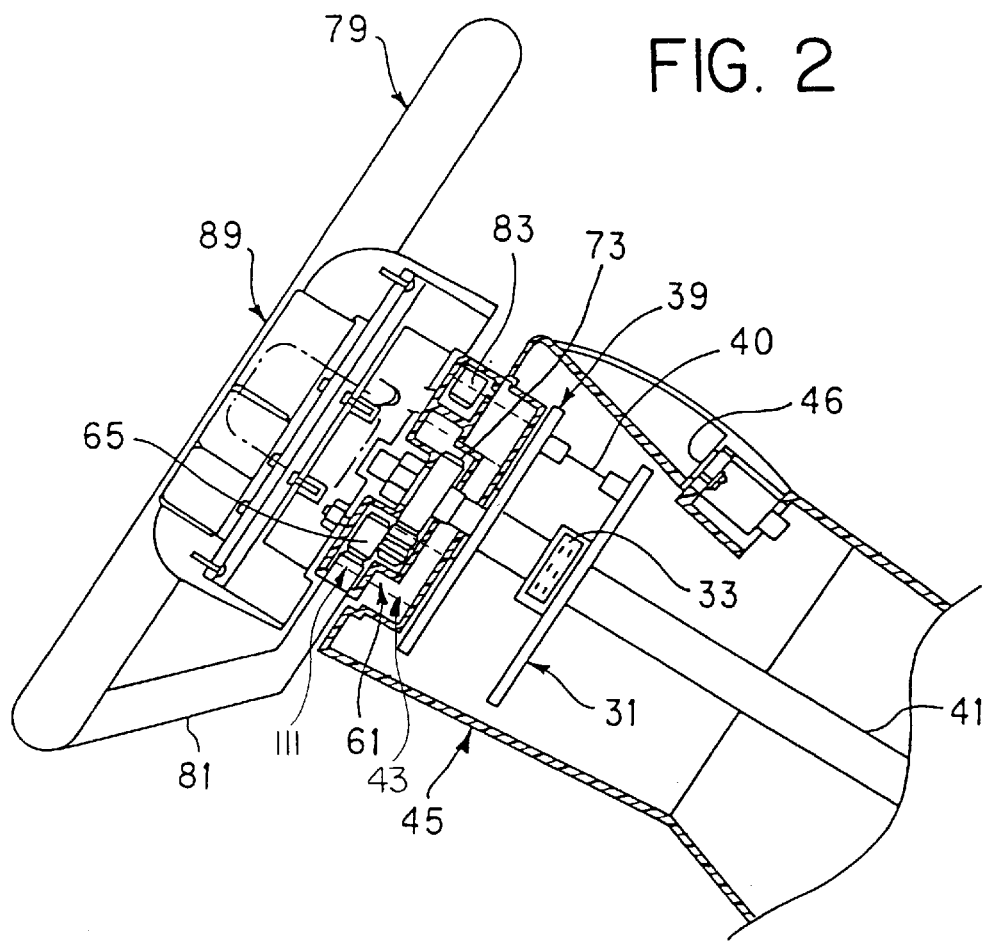
FIG. 2 is a cross sectional view showing a state in which the steering module shown in FIG. 1 has been assembled.
Figure 3:
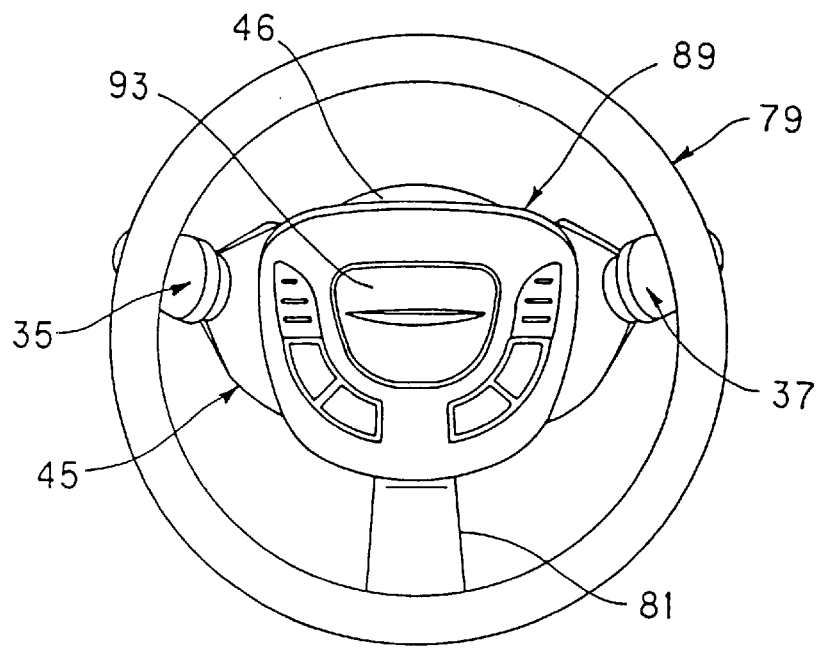
FIG. 3 is a front view showing a state in which the steering module shown in FIG. 2 is viewed from a cabin.
Figure 4:
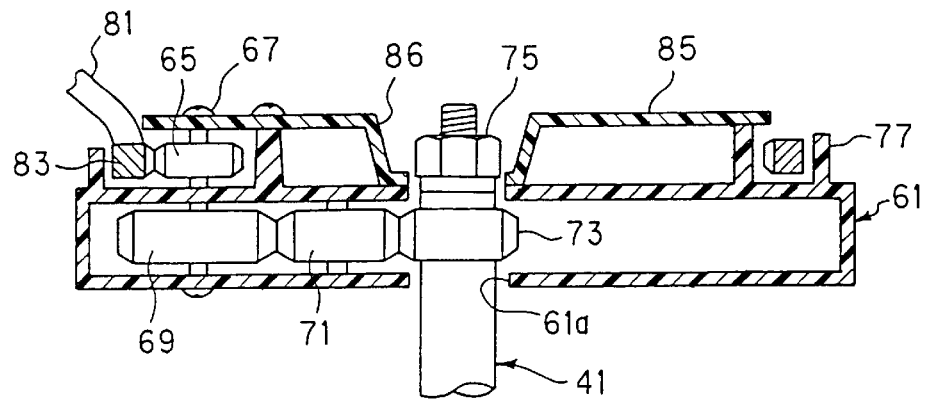
FIG. 4 is a cross sectional view showing the gear box shown in FIG. 1.

An embodiment of a steering module according to the present invention will now be described with reference to FIGS. 1–5.

A main substrate 31, to which a car-body-side wire harness is electrically connected, is secured to a member (a column bracket or the like) of a car body portion 44. A vehicle signal circuit, an LCD circuit and so forth are formed on the main substrate 31. A pair of substrate-side lever switch connectors 33, which are connected to the vehicle signal circuit, are mounted on the main substrate 31. The substrate-side lever switch connectors 33 are arranged to be engaged with corresponding lever switch units 35 and 37 (described later).

A member or a relay substrate 39 is disposed apart from the car-body-side surface (hereinafter called a "front surface") of the main substrate 31 to be in parallel with the main substrate 31. The main substrate 31 and the relay substrate 39 are electrically connected to each other through a substrate-connecting cable (FFC) 40.

The main substrate 31 and the relay substrate 39 have, in the central portions thereof, shaft insertion holes 31a and 39a through which a steering shaft 41 is inserted. A plurality of car-body-side connectors 43 of first connectors, such as a pad connecting connector and an air-bag connecting connector, are mounted on the front surface of the relay substrate 39. The car-body-side connectors 43 are disposed such that the engagement surfaces of the connectors 43 engaging with the mating connectors face forward.

A column cover 45 is secured to a column bracket (not shown). The column cover 45 accommodates the main substrate 31 and the relay substrate 39. The column cover 45 has a through hole 45a which is penetrated by the steering shaft 41.

An LCD unit 46 is attached to the column cover 45. The LCD unit 46 permits display of a state of operations of switches of a pad (described later). As a result, the states of the operations of the various switches can easily be recognized.

Lever-switch receiving holes 47 are formed in the two side surface of the column cover 45. When the column cover 45 has been secured to a predetermined position, the lever-switch receiving holes 47 coincide with the substrate-side lever switch connectors 33. The lever switch units 35 and 37 are inserted into the lever-switch receiving holes 47, respectively.

The lever switch units 35 and 37 have base portions on which unit-side connectors 53 are disposed. When the unit-side connectors 53 are engaged with the substrate-side lever switch connectors 33, the lever switch units 35 and 37 are electrically connected and joined to the main substrate 31.

As an alternative to supporting and securing the lever switch units 35 and 37 by the engagement and locking between the substrate-side lever switch connectors 33 and the unit-side connectors 53, an engaging mechanism may be provided to be engaged with those of the column cover 45 so that the lever switch units 35 and 37 are supported and secured by the column cover 45.

The lever switch units 35 and 37 are formed into conical shapes having shorter overall lengths and incorporating base portions having larger diameters as compared with conventional rod-shape lever switch units. Since the foregoing shapes are employed, holding easiness can be improved and strokes required when the lever switch units 35 and 37 are operated can be shortened. As a result, a satisfactory operability can be realized.

A circular recess 55 is so formed in the front surface of the column cover 45 as to be coaxial with the through hole 45a. Right and left connection knock portions 57 interposing the through hole 45a are projected in the recess 55. The connection knock portions 57 have openings 59 for exposing the car-body-side connectors 43. The openings 59 are respectively formed in the central portions of the connection knock portions 57. Engaging members, such as elastic engaging members (not shown), are formed on the outer surfaces of the connection knock portions 57, the engaging members are structured so as to be engaged with corresponding engaging portions of a pad (described later).

A gear box 61 is formed into a flat cylindrical shape and is received in the recess 55 of the column cover 45. A shaft hole 61a permitting appearance of an end of the steering shaft 41 is formed in the central portion of the gear box 61. Right and left relay holes 63 are formed in the front surface of the gear box 61 to interpose a shaft hole 61a. The relay holes 63 accommodate the connection knock portions 57.

An intermediate gear 65 is disposed in the front surface of the gear box 61. The intermediate gear 65 is secured to a rotation shaft 67 (see FIG. 4) supported rotatably with respect to the gear box 61. A box-inside intermediate gear 69 is secured to the rotation shaft 67 in the gear box 61. A relay gear 71 which is engaged with the box-inside intermediate gear 69 is rotatably supported in the gear box 61.

The steering shaft 41 is inserted into the shaft hole 61a in the gear box 61. An external gear 73 is secured to the steering shaft 41 by a nut 75. The external gear 73 secured to the steering shaft 41 in the gear box 61 is engaged with the above-mentioned relay gear 71.

A peripheral wall 77 is formed on the front surface of the gear box 61. The peripheral wall 77 accommodates an annular internal gear 83 connected to the steering wheel 79 through a spoke 81. The internal gear 83 accommodated in the peripheral wall 77 is engaged with the above-mentioned intermediate gear 65 disposed in the front surface of the gear box 61. Movement of the internal gear 83 in the axial direction of the steering shaft is inhibited by a gear cover 85 secured to the front surface of the gear box 61 with screws (not shown). As a result, the internal gear 83 is rotatably held and secured in the peripheral wall 77.

A nut-clamping hole 86 for clamping the nut 75 is formed in the central portion of the gear cover 85. Right and left relay holes 87 for permitting appearance of the connection knock portions 57 accommodated in the relay holes 63 are formed such that the nut-clamping hole 86 is interposed between the relay holes 87. Therefore, the car-body-side connectors 43 is exposed through the relay holes 87 of the gear cover 85.

When the steering wheel 79 is rotated, the internal gear 83 accommodated in the recess 55 rotates the intermediate gear 65 in the same direction. When the intermediate gear 65 is rotated, the box-inside intermediate gear 69 is rotated. The box-inside intermediate gear 69 rotates the steering shaft 41 through the relay gear 71 and the external gear 73.

At this time, the gear box 61 and the gear cover 85 secured to the column cover 45 are made to be non-rotative so that stationary states are maintained regardless of the rotations of the steering wheel 79.

Figure 5:
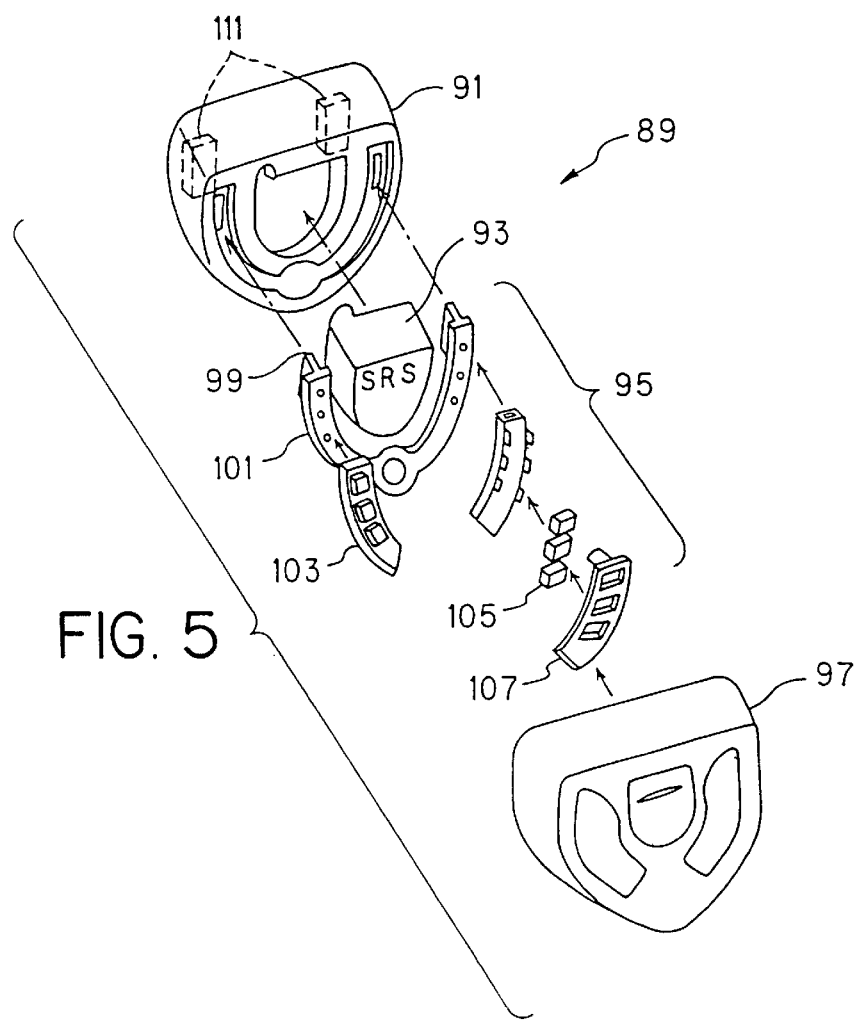
FIG. 5 is an exploded perspective view showing the pad shown in FIG. 1.
Figure 6:
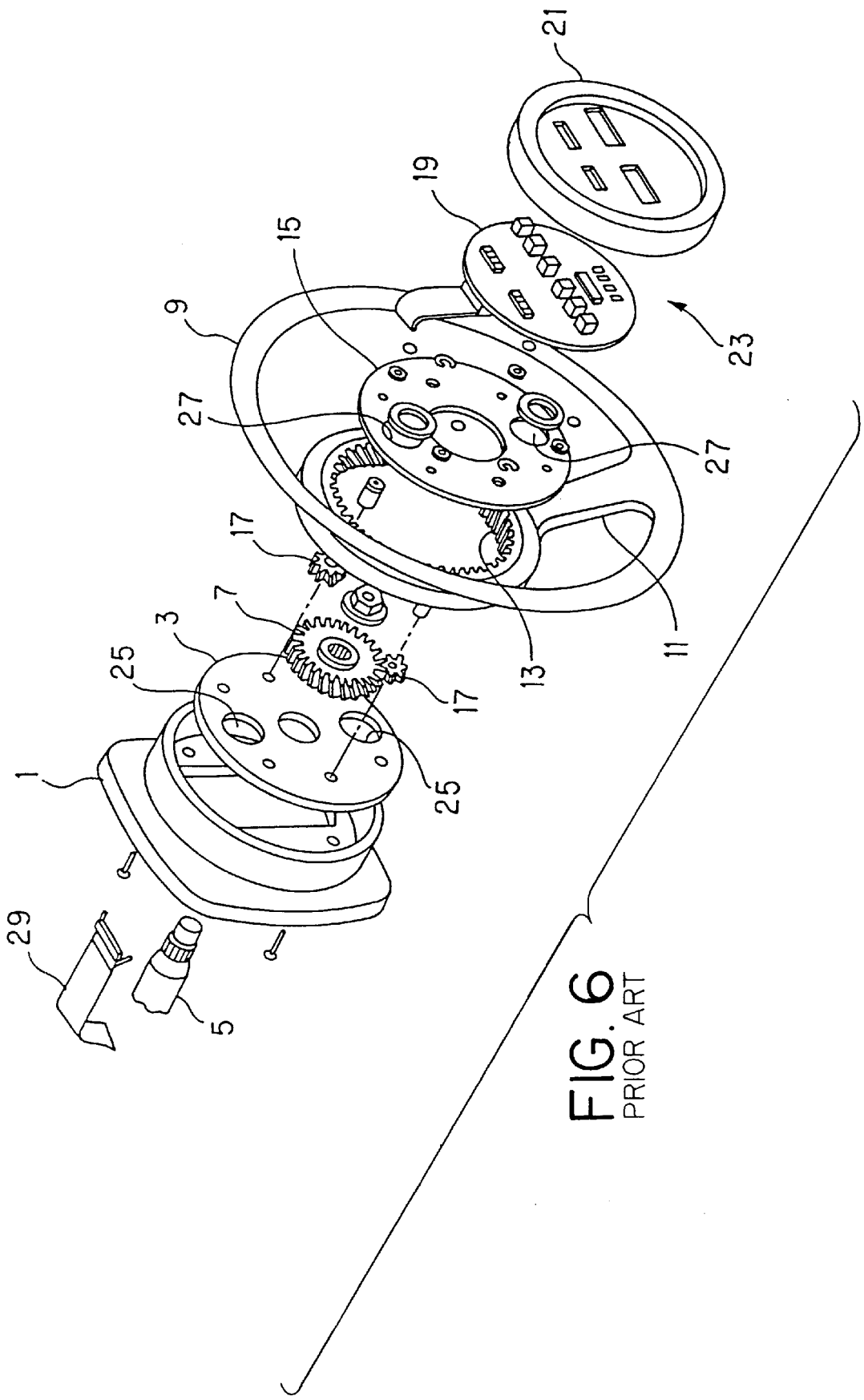
FIG. 6 is an exploded perspective view showing a steering wheel apparatus.
Figure 7:
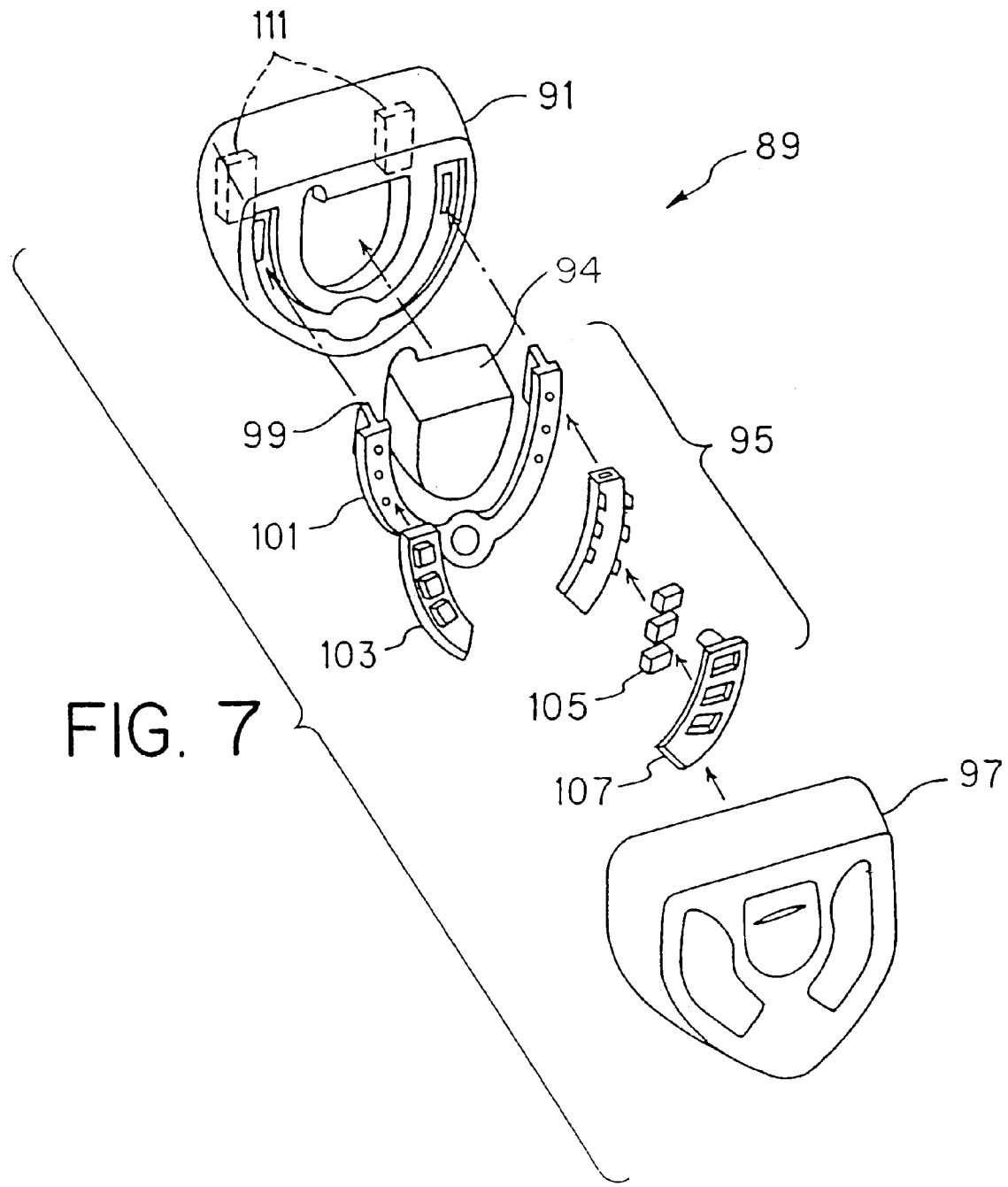
FIG. 7 is an exploded perspective view of a pad similar to FIG. 5, but with operation switches instead of an air bag.

A pad 89 having a display unit, operation switches 94 or an air bag is joined to the front surface of the gear cover 85. As shown in FIG. 5, the pad 89 includes a pad body 91, an air bag 93, an electric part or a switch unit 95 and a pad seat 97.

The switch unit 95 includes a switch substrate (HPC) having a connector 99, a light-transmissive plate 103 for transmitting light beams from a light source (not shown), a key top 105 and a holding frame 107.

The pad 89 is assembled such that the air bag 93 is mounted on the central portion of the pad body 91. Then, the switch substrate 101 is, through the connector 99, joined to a portion on the outside of a hole for joining the air bag 93. Then, the light-transmissive plate 103 and the key top 105 are joined to the upper surface of the switch substrate 101. Then, the holding frame 107 is joined after which the overall body of the pad body 91 is covered with the pad seat 97. Thus, the assembling operation is completed. A plurality (two in this embodiment) of pad-side connectors 111, or second connectors, for establishing the electric connections of electric circuits of the display unit, the operation switches or the air bag are secured to the rear surface of the pad body 91. The pad-side connectors 111 are disposed at positions which coincide with the car-body-side connectors 43 allowed to expose in the relay holes 87 of the gear cover 85.

Engaging portions (not shown) are provided on the rear surface of the pad body 91. The engaging portions are engaged with engaging members of the connection knock portions 57 allowed to expose in the relay holes 87 of the gear cover 85. Therefore, the pad 89 is secured to the connection knock portions 57 by making coincide the pad-side connectors 111 with the car-body-side connectors 43 from the front surface of the gear cover 85. Simultaneously with this, the engaging portions are engaged with the engaging members of the connection knock portions 57.

When the steering module 113 having the above-mentioned components is assembled, the steering shaft 41 is inserted to secure the main substrate 31 to the column bracket (not shown). Then, the steering shaft 41 is inserted into the front surface of the main substrate 31 so that the relay substrate 39 is secured.

Then, the steering shaft 41 is inserted so that the column cover 45 is secured to the column bracket (not shown). In the foregoing state, the lever switch units 35 and 37 can be mounted. The process for mounting the lever switch units 35 and 37 is performed by inserting, through the lever-switch receiving holes 47 of the column cover 45, the base portions of the lever switch units 35 and 37. Thus, the unit-side connectors 53 are engaged with the substrate-side lever switch connectors 33.

Then, the gear box 61 is secured to the recess 55 from the front surface of the column cover 45.

The internal gear 83 connected to the steering wheel 79 is inserted into the peripheral wall 77 of the gear box 61. The gear cover 85 is secured to the front surface of the gear box 61 such that the internal gear 83 is interposed.

As a result, the steering wheel 79 is rotatably secured to the gear box 61 through the internal gear 83. Moreover, the connection knock portions 57 and the car-body-side connectors 43 are exposed from the front surface of the gear cover 85.

Finally, the engaging portions of the pad 89 are engaged with the engaging members of the connection knock portions 57 so that the pad 89 is secured to the front surface of the gear cover 85. Thus, the car-body-side connectors 43 and the pad-side connectors 111 are engaged with one another so that the process for assembling the steering module 113 is completed.

Therefore, the steering module 113 can be assembled by sequentially disposing, from the front surface, the main substrate 31, which is the lowermost member, the relay substrate 39, the column cover 45, the gear box 61, the steering wheel 79, the gear cover 85 and the pad 89. Thus, a so-called stacking method can be employed to dispose the foregoing components in the above-mentioned sequential order.

As described above, the steering module 113 has the structure that the pad-side connectors 111 of the pad 89 is directly secured to the car-body-side connectors 43 of the relay substrate 39 through the connection knock portions 57. Therefore, the necessity which arises for the structure that the car-body-side wire harness is inserted into the components so as to be drawn out can be eliminated. The operation for inserting the wire harness into the components can be omitted so that the workability of the assembling operation is improved.

The connection knock portions 57 are disposed at the inside of the internal gear 83 in a front view. Moreover, the car-body-side connectors 43 are accommodated in the connection knock portions 57. In addition, the pad-side connectors 111 are directly engaged with the car-body-side connectors 43. Therefore, the necessity of inserting the wire harness having a slack into the internal gear 83 can be eliminated. As a result, a bite of the wire harness can reliably be prevented.

As described above, the steering module according to the present invention has the structure that the car-body-side connectors 43 electrically connected to the car-body-side wire harness 42 are disposed and secured to the inside portion of the internal gear. Moreover, the pad-side connectors 111 are arranged in the pad. The padside connectors 111 are engaged with the car-body-side connectors 43 so that the pad 89 is electrically connected. Therefore, the necessity of inserting the wire harness into the components can be eliminated from the steering wheel structure having the pad 89 attached to the central portion of the steering wheel. Thus, the workability of the assembling operation can be improved.

On the inside of the internal gear, the car-body-side connectors and the pad-side connectors establish the electric connection without using the wire harness. Therefore, a bite of the wire harness can reliably be prevented.

What is claimed is:

1. A steering module, comprising:

a steering wheel;

a member having an opening, the steering wheel being connected to a steering shaft which passes through the opening in the member;

a pad having at least one electric part, the pad being attached to the member through the steering wheel;

a first connector arranged in the member; and a second connector arranged in the pad, the second connector electrically connecting with the electrical part, and electrically connected to the first connector.

2. The steering module of claim 1, wherein when the pad is attached to the member attached to the car body portion, the second connector is electrically connected to the first connector.

3. The steering module of claim 1, further comprising:

an external gear secured to the steering shaft;

an internal gear connected to the steering wheel, the internal gear being arranged to surround the external gear; and an intermediate gear rotatably supported by the member attached to the car body portion, the intermediate gear being located between and engaged with the external gear and the internal gear;

wherein the first connector is located at an inside of the internal gear.

4. The steering module of claim 1, wherein the first connector electrically connects with a wire harness arranged in the car body portion.

5. The steering module of claim 1, wherein the electric part includes one of a display unit and an operation switch mounted in the pad.

* * * * *